T. P. Wilcox.
Water Elevator.

Nº 97,011.        Patented Nov. 16, 1869.

Witnesses:
Harry N. Myatt
Edmund Masson

Inventor
T. P. Wilcox.
By Atty A. B. Stoughton

United States Patent Office.

T. P. WILCOX, OF HEBRON, INDIANA.

Letters Patent No. 97,011, dated November 16, 1869.

IMPROVEMENT IN WATER-ELEVATORS.

The Schedule referred to in these Letters Patent and making part of the same.

*To all whom it may concern:*

Be it known that I, T. P. WILCOX, of Hebron, in the county of Porter, and State of Indiana, have invented certain new and useful Improvements in Water-Elevators or Apparatus for Raising Water from Wells; and I do hereby declare the following to be a full, clear, and exact description of the construction and operation of the same, reference being had to the accompanying drawings, making a part of this specification, in which—

Similar letters of reference, where they occur in the separate figures, denote like parts in both of the drawings.

Figure 1:
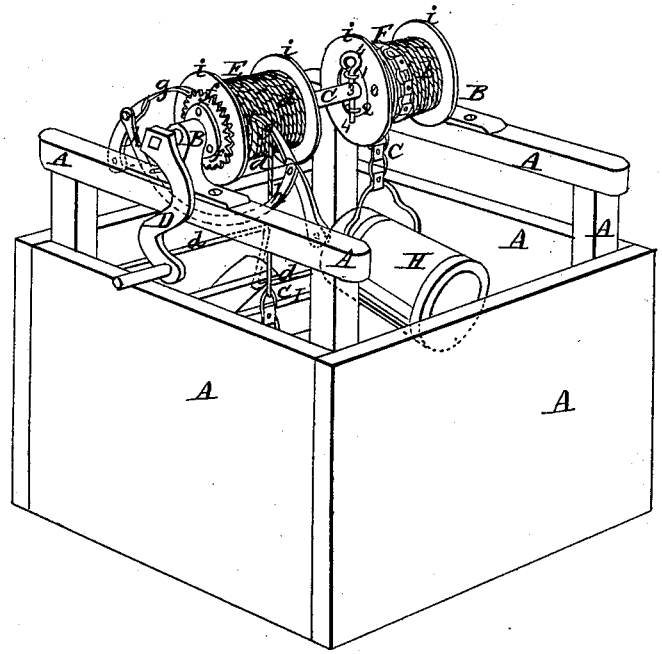
Figure 1 represents a perspective view of the elevator.
Figure 2:
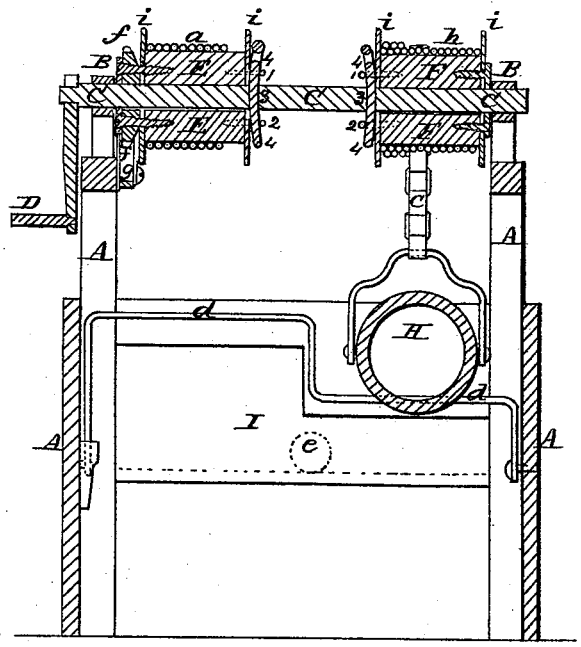
Figure 2 represents a vertical section through the same.

My invention relates to a water-elevator, in which two drums are arranged on one shaft, and always turn with said shaft, and in the same direction with it, each drum having a separate and independent cord or chain that is separately adjustable as to length, while both drums and the crank-shaft, on which they are attached, are caught and held by one or the other of a pair of pawls linked together, and working in a common ratchet, as will be explained.

To enable others skilled in the art to make and use my invention, I will proceed to describe the same with reference to the drawings.

A represents a well-curb and frame, in suitable bearings B B, on which frame a shaft, C, is hung, which may be turned by a crank, D, at one of its ends.

Upon the shaft C are two drums, E F, which are loose on said shaft, and without other appliances, would not turn with the shaft, but which are keyed or locked to the shaft by a simple mechanism, which can be removed and replaced in a moment, as will be explained.

Each drum has its own independent cord or chain *a b*, and each has its own independent bucket G H, the buckets being united to their respective cord, rope, or chain by a section of flat chain, *c*, that will, in winding, always bring the buckets in proper position to the tipping-rod or bar *d*, so as to tilt and empty the contents of the bucket into the trough I, whence it runs out through a spout, *e*.

On the shaft C, or over it, and fastened to one of the drums E, is placed a star-ratchet, *f*, and to the frame A, on opposite sides of the shaft C, there are pivoted pawls *g g* that are linked together by a link, *h*, properly bent, to clear the drum and ratchet, and so that as one pawl or dog is thrown into action with the ratchet *f*, the other will be thrown out of action, and *vice versa*, as the buckets which are hung to wind on opposite sides of the drums, should require in their alternating filled and emptied condition.

Flanges *i i* are made on the ends of the drums, to catch and hold the rope or chain as is common.

In one end of each of the drums E F there is driven, or otherwise fastened, staples, loops, or dead-eyes 1, 2, through which, and through a hole, 3, in the shaft C, passes a pin, 4, which locks the drum to the shaft, and causes them to turn together. When, however, this pin is withdrawn, the drum is loose on the shaft, and can be turned independent of the other drum, which at times becomes important, as, for instance, in adjusting the length of the ropes, so that the bucket on one will reach the water and fill, while the bucket on the other is caught by the tipping-rod to be emptied.

The descent of one bucket is defined by the ascent of the other bucket, and if the height of the water in the well should change, or one rope become shorter by breaking and uniting it again, the buckets must be adjusted accordingly.

This attaching and detaching-mechanism, by which the drums shall turn with the shaft, and be loosened to adjust the relative lengths of the ropes or chains, is quite important in this simple form of elevator, where, by intricate gearing, two shafts are used, and a drum on each, alternating buckets can be readily used; but with the simple crank-shaft, and two drums, and two independent ropes or chains, when two buckets are used, there must be a regulating-mechanism to adjust the ropes or chains relatively to each other, and to the surface of the water in the well, and the tipping or delivering point in the curb.

As the buckets alternate, one full and the other empty, the pawls are thrown in and out, so as to hold against the overpoise of the full one.

Having thus fully described my invention,

What I claim therein as new, and desire to secure by Letters Patents, is—

In a water-elevator, the combination with a single crank-shaft, C, of the two drums E F thereon, each furnished with an independent rope or chain, for raising and lowering an independent bucket, and always turning with said shaft, and in the same direction with it, and secured thereto by staples and pin, or other releasing and adjusting-mechanism for adjusting the rope or chains to the height of the water in the well, the whole arranged to operate as and the purpose described.

Also, in combination with a single shaft, and the two drums secured thereon by staples and pin, or other releasing and adjusting-mechanism, each of said drums containing the rope or chain of one of a pair of alternating buckets, the two hinged and linked pawls, and a single star-ratchet, in which the two pawls work, the whole being arranged to operate in the manner and for the purpose described.

T. P. WILCOX.

Witnesses:
 WEST WINSLOW,
 G. W. SAMPSON.